No. 736,608. PATENTED AUG. 18, 1903.
J. G. V. LANG.
BRAKE APPARATUS FOR ELECTRIC RAILWAY OR TRAMWAY VEHICLES.
APPLICATION FILED FEB. 17, 1903.
NO MODEL.
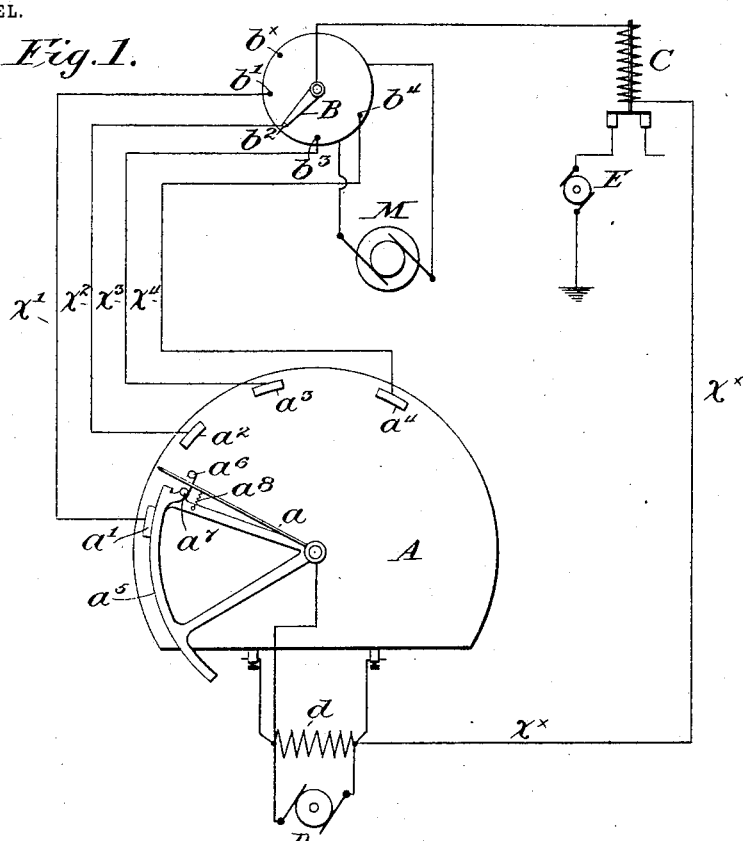
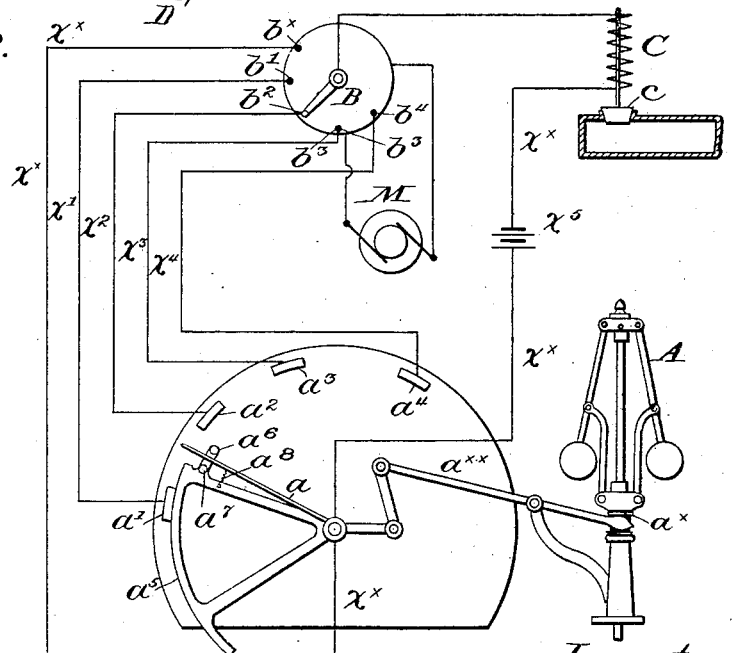
Witnesses:
M. F. Keating
A. T. Looney
Inventor:
Johan Gustaf Victor Lang
By his Attorney
Charles J. Kintner No. 736,608. Patented August 18, 1903.

UNITED STATES PATENT OFFICE.

JOHAN GUSTAF VIKTOR LANG, OF LONDON, ENGLAND, ASSIGNOR OF ONE-HALF TO EDWARD HIBBERD JOHNSON, OF LONDON, ENGLAND.

BRAKE APPARATUS FOR ELECTRIC RAILWAY OR TRAMWAY VEHICLES.

SPECIFICATION forming part of Letters Patent No. 736,608, dated August 18, 1903.

Application filed February 17, 1903. Serial No. 143,875. (No model.)

*To all whom it may concern:*

Be it known that I, JOHAN GUSTAF VIKTOR LANG, electrician, a subject of the King of Sweden and Norway, residing at 16ª Soho Square, in the city of London, England, have invented certain new and useful Improvements Relating to the Brake Apparatus of Electric Railway and Tramway Vehicles, of which the following is a specification.
This invention relates to the brake apparatus of electric railway and tramway vehicles, and has for its object to impart to such vehicles the degree of safety which characterizes high-class electric-elevator services provided with so-called "self-acting" safety-brakes and which is now greatly needed in view of the numerous serious accidents that have occurred by reason of the vehicles getting beyond control of the motorman when descending steep gradients.

The said invention has reference more particularly to that class of electric railway or tramway equipment known as the "compound regenerative;" but the invention is not necessarily limited thereto, as it will be obvious from the statements hereinafter set forth that it may be readily adapted to other types of railway or tramway equipment by making trifling modifications in the mode of carrying the invention into practice.

As is well known, an inseparable accompaniment of the regenerative electric motor is that of retardation. Hence should a vehicle provided with a regenerative motor receive any impetus from other sources than its own motive power—as, for instance, from the acceleration due to its travel on a descending gradient—the motor will quickly and automatically become an electric generator and power-brake. The effect of this change from the motor characteristic to the generator characteristic is to confine the speed of the vehicle to a definite and small percentage of increase over and above that normally demanded by the position which the motor-controller occupies when the aforesaid change takes place. There obviously exists, therefore, an important and valuable safety factor in that so long as the electric equipment is in proper operative condition the vehicle is held in bond to the normal speed and cannot run away. In the event, however, of a failure in the supply of the electric energy to the motor occurring by the loss of the trolley connection or by the opening of the overload-switch or otherwise the vehicle would immediately be denuded of this safety factor and would then be uncontrollable except through the agency of the hand-brakes, which are far from reliable, depending, as they do, upon the motorman's presence of mind and promptness for causing them to effectually operate at the moment of emergency.

According to this invention the automatic retarding function of the regenerative motor is supplemented by mechanical or other self-acting power-brakes, and these two braking systems are so arranged that upon any failure of the braking function of the primary electric equipment, however caused, it would be immediately and automatically replaced or supplemented by the mechanical braking system. For this purpose the mechanical braking system is so arranged that the brakes are normally held "off" or in their inoperative condition by an electromagnetic switch or other electrically-controlled contrivance forming part of suitably-arranged electric circuits and stationary contacts that are controlled by a movable contact governed by the speed of the vehicle and by a movable contact governed by the motor-controller. The arrangement is such as to effect the automatic transference of the control of the speed of the vehicle from the regenerative motor to the mechanical braking system immediately upon any derangement of the former taking place whether such derangement arises from an accidental failure of the electrical energizing force or from the intentional cutting off of the electric energy by the motorman for the purpose of effecting a final stop of the vehicle.

In order that the said invention may be clearly understood and readily carried into effect, the same will now be described more fully with reference to the accompanying drawings, in which—

Figure 1 is a diagrammatic view of the arrangement of electric circuits and the stationary and movable contacts when an electrodynamic speed-indicator is employed for controlling the movable speed-contact. Fig. 2 is another diagrammatic view showing the arrangement of the said circuits and contacts when centrifugal mechanism is employed for controlling the movable speed-contact.

A is the electrodynamic speed-indicator or centrifugal mechanism, and $a$ the movable speed-contact or needle thereof. B is the movable controller-contact, and C is the switch.

$a'$ $a^2$ $a^3$ $a^4$ are the stationary contacts, controlled by the movable speed-contact, and $b'$ $b^2$ $b^3$ $b^4$ are the stationary contacts, controlled by the movable controller-contact.

$a^5$ is a light segmental contact-frame, which is formed of suitable conductive material and is loosely mounted on the axle of said needle, but is electrically insulated therefrom. The end of the said segmental contact-frame adjacent to the needle is furnished with a forked portion comprising two stops $a^6$ $a^7$, the latter of which is electrically insulated from said frame. The needle lies between these stops, which are situated at such a distance apart as to permit of a certain amount of lost motion between the needle and frame. The said needle is normally kept pressed against the insulated stop $a^7$ by a light spring $a^8$. When, however, the needle moves forward in response to an increase of speed of the vehicle, it leaves the stop $a^7$ and comes against the stop $a^6$ and in continuing its movement carries with it the frame, thereby electrically connecting with the needle all the contacts it has already passed as long as the needle has a tendency to move forward.

Referring more particularly to Fig. 1, D is a small electric generator, which is driven directly or indirectly from the armature-shaft of the car-motor M or from the vehicle wheel-axle. In circuit with this generator is the speed-indicator A, which in the present case is in the form of a powerful voltmeter situated in circuit with the motor-circuit through a resistance $d$. The needle $a$ of this voltmeter is adapted by its movements due to the various speed values to close (through the stop $a^6$) one or other of a number of electric circuits $x'$ $x^2$ $x^3$ $x^4$, which include the movable controller contact or finger B of the motor-controller and the solenoid of the electromagnetic switch C. The stationary contacts $a'$ $a^2$ $a^3$ $a^4$ of the voltmeter belonging to the several speed positions are by means of the said circuits $x'$ $x^2$ $x^3$ $x^4$ so connected to the stationary contacts $b'$ $b^2$ $b^3$ $b^4$ of the controller that when the controller-handle is standing on a given notch the movable contact-finger B of the controller is electrically connected, through one or other of the said stationary contacts $b'$, $b^2$, $b^3$, or $b^4$ and circuits $x'$, $x^2$, $x^3$, or $x^4$, with the contacts $a'$, $a^2$, $a^3$, or $a^4$ of the voltmeter corresponding to the maximum speed allowed for that particular notch of the controller. Thus assuming the parts to be in the position represented in Fig. 1—i. e., when the controller-handle has been turned by the motorman to the notch of the controller in which the contact-finger B lies on the stationary contact $b^2$—then if the needle of the voltmeter, owing to an increase of the speed beyond that allowed for this particular notch of the controller, causes the contact-frame to reach the contact $a^2$ the circuit $x^2$ will be closed and current will flow though the needle, the stop $a^6$, and the contact-frame $a^5$ to the contact $a^2$ and the movable contact-finger B and thence to the switch C, controlling the mechanical brake system. This switch is thus operated and the brakes are caused to be applied. In the example illustrated the mechanical brake system comprises potentially-set brakes normally held off by a small electric motor E and suitable gearing, so that when said switch is opened by the flow of the current in the said circuit $x^2$, as aforesaid, the current-supply to this motor will be stopped and the brakes be permitted to operate for retarding or stopping the vehicle.

If the controller-handle is turned forward to the next succeeding notch of the controller, the contact-finger B will follow the movement of the controller-handle, and thus reach the succeeding contact $b^3$, the speed of the vehicle being of course increased accordingly. If the speed should increase beyond that allowed by this position of the controller-handle, the needle $a$ of the speed-indicator will advance far enough to let the contact-frame $a^5$ reach the contact $a^3$, and current will then pass from this contact through the circuit $x^3$ to the fixed controller-contact $b^3$ and the movable contact-finger B to the switch C, thereby operating the mechanical brakes and permitting them to be applied as aforesaid.

If the controller-handle were turned forward the distance of, say, two notches instead of only one—i. e., so that the movable contact-finger B moved from contact $b^2$ to $b^4$—the mechanical brakes would not come into operation unless the speed increased to the maximum allowed for the notch corresponding with contact $b^4$ and the contact-frame $a^5$ reached the corresponding stationary contact $a^4$ of the voltmeter.

If the controller-handle were turned backward—say to the notch of the controller corresponding with the stationary contact $b'$—the contact-finger B would of course reach this contact, and if the speed of the vehicle became correspondingly reduced, as it should do under normal conditions, the needle $a$ and its contact-frame would move backward until the said frame passed the stationary contact $a'$ of the voltmeter, said needle during this movement lying in contact with the insulated stop $a^7$; but if the speed of the vehicle should not become thus reduced, but, on the contrary, increased, the needle $a$ would move into contact with the stop $a^6$ of the contact-frame, thereby becoming electrically connected with the stationary contact $a'$ through said frame and permitting current to flow through the circuit $x'$ to the movable contact-finger B and the switch C, and thus cause the brakes to be applied.

At the off position of the controller-handle—i. e., when no current is being supplied to the motor—the current-supply to the "holding-off" motor is also disconnected.

Referring now to Fig. 2, which shows centrifugal mechanism in substitution for the voltmeter, in this case the sliding sleeve $a^{\times}$ of said governor is connected with the needle $a$ by means of a lever $a^{\times\times}$ and suitable links for obtaining an amplified movement of the needle. In this case the switch C is adapted to control the valve $c$ of a vacuum-brake instead of a mechanical brake. The said governor is driven by suitable gearing from the armature-shaft of the motor or from one of the vehicle wheel-axles, like the electric generator D. (Shown in Fig. 1.) The said needle is in circuit with a battery $x^5$ or other source of electricity and with the solenoid of the switch C through the movable contact-finger B. The stationary contacts $a'$ $a^2$ $a^3$ $a^4$ and $b'$ $b^2$ $b^3$ $b^4$ and the circuits $x'$ $x^2$ $x^3$ $x^4$ are arranged similarly to the corresponding contacts and circuits in Fig. 1. The working of the apparatus is in all respects similar to that already described with respect to the said Fig. 1, and therefore need not be further described. At the off position the movable contact B lies against the stationary contact $b^{\times}$, and the current then flows through the circuits $x^{\times}$ $x^{\times}$ direct to the switch C through the movable contact-finger B, thus insuring the action of the brakes, as before stated.

What I claim, and desire to secure by Letters Patent of the United States, is—

1. In brake apparatus for electric-railway vehicles, the combination with the electric motor and its controller, of a device controlled by the speed of the vehicle, and means including circuits and circuit connections between the device and the controller whereby said device will operate to cause the brakes to be applied if the speed increases beyond that which is normal to a particular position of the motor-controller, substantially as described.

2. In brake apparatus for electric-railway vehicles, the combination with the electric motor and its controller, of a speed-indicator, and means including circuits and circuit connections between the device and the controller whereby said indicator will operate to cause the brakes to be applied if the speed increases beyond that which is normal to a particular position of the motor-controller, substantially as described.

3. In brake apparatus for electric-railway vehicles, the combination with the electric motor and its controller, of a voltmeter and means including circuits and circuit connections between the device and the controller whereby said voltmeter will operate to cause the brakes to be applied if the speed of the vehicle increases beyond that which is normal to a particular position of the motor-controller, substantially as described.

4. In brake apparatus for electric-railway vehicles, the combination with the electric motor and its controller, of a movable contact controlled by the said motor-controller, a movable contact controlled by the speed of the vehicle, and means whereby said contacts operate to cause the brakes to be applied if the speed of the vehicle increases beyond that which is normal to a particular position of the motor-controller, substantially as described.

5. In brake apparatus for electric-railway vehicles, the combination with the electric motor and its controller, of a movable contact controlled by the said motor-controller, a movable contact controlled by the speed of the vehicle, electric circuits between the two movable contacts, and means whereby when any of said circuits is closed through the said contacts, the brakes will be automatically applied substantially as described.

6. In brake apparatus for electric-railway vehicles, the combination with the electric motor and its controller, of a movable contact controlled by the said motor-controller, a movable contact controlled by the speed of the vehicle, a movable segmental contact-frame controlled by said speed-contact, a series of stationary contacts with which said movable controller-contact coöperates, a series of stationary contacts with which said movable speed-contact, through the said frame, coöperates, conductors connecting together the members of the two series of stationary contacts in pairs, an additional stationary contact with which the movable controller-contact coöperates when the motor-controller is in its "off" position, an electromagnetic device in circuit with the movable controller-contact, and means whereby when said electromagnetic device is actuated by current passing through said contacts, the brakes are applied substantially as described.

7. In brake apparatus for electric-railway vehicles the combination with the electric motor and its controller, of a movable contact controlled by the said motor-controller, a movable contact controlled by the speed of the vehicle, a movable segmental contact-frame loosely mounted on the axle of said movable speed-contact, a pair of stops on said frame between which the movable speed-contact lies, and by which it is operated, one of said stops being insulated, a spring tending to keep said movable speed-contact against the insulated stop, a series of stationary contacts with which the movable controller-contact coöperates, a series of stationary contacts with which the said frame coöperates, conductors connecting together in pairs the members of the two series of stationary contacts, an additional stationary contact with which the movable controller-contact coöperates when the motor-controller is in its "off" position, an electromagnetic device in circuit with the movable controller-contact and means whereby, when said electromagnetic device is energized by current passing through said contacts, the brakes are applied, substantially as described.

8. In brake apparatus for electric-railway vehicles, the combination with the electric motor and its controller, of a movable contact controlled by the said motor-controller, a movable contact controlled by the speed of the vehicle, a movable segmental contact-frame loosely mounted on the axle of said movable speed-contact, a pair of stops on said frame between which the movable speed-contact lies and by which it is operated, one of said stops being insulated, a spring tending to keep said movable speed-contact against the insulated stop, a series of stationary contacts with which the movable controller-contact coöperates, a series of stationary contacts with which the movable speed-contact coöperates by means of the said frame, conductors connecting together in pairs the members of the two series of stationary contacts, an additional stationary contact with which the movable controller-contact coöperates when the motor-controller is in its "off" position, an electric switch in circuit with the movable controller-contact and means whereby when said switch is energized by current passing through said contacts, the brakes are applied substantially as described.

9. In brake apparatus for electric-railway vehicles, the combination with a motor of the regenerative type and its controller, of self-acting power-brakes and means whereby in the event of said motor failing to perform its braking action, said brakes will be automatically applied substantially as described.

10. In brake apparatus for electric-railway vehicles, the combination with a motor of the regenerative type and its controller, of self-acting power-brakes, a device controlled by the speed of the vehicle, and means including circuits and circuit connections whereby said device will operate to cause the brakes to be applied if the speed increases beyond that which is normal to a particular position of the motor-controller substantially as described.

In testimony whereof I have hereunto set my hand, in presence of two subscribing witnesses, this 2d day of February, 1903.

JOHAN GUSTAF VIKTOR LANG.

Witnesses:
   WOLDEMAR HAUPT,
   WILLIAM MAYNER.